3,390,181
PROCESS FOR PREPARING N-NITRO-N-
FLUORO-AMINES
Vytautas Grakauskas, Arcadia, Calif., assignor to Aerojet-
General Corporation, Azusa, Calif., a corporation of
Ohio
No Drawing. Filed Oct. 14, 1964, Ser. No. 404,205
15 Claims. (Cl. 260—583)

This invention relates to a novel method for the preparation of N-fluoro-N-nitroamines.

It is an object of this invention to prepare compounds containing one or more terminal groups of the formula:

by a novel process. More specifically, it is an object of this invention to react organic compounds containing at least one N-fluorocarbamate terminal group with a nitrating agent. It is another object of this invention to prepare these compounds containing at least one nitrogen to fluorine linkage in a novel manner in good yield and without extensive contamination. These and other objects of this invention will be apparent from the detailed description which follows.

The novel process of this invention involves the nitration of organic compounds containing at least one N-fluorocarbamate terminal grouping of the formula:

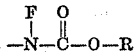

wherein R is any hydrocarbyl group. The free valence of the above group may be satisfied by essentially any organic radical. The exact nature of the organic portion of the molecule is not critical since the nitration reaction involves only the carbamate moiety, to form the high energy grouping

with carbon dioxide and organic nitrates being produced as byproducts. It is to be understood that the organic compound which is nitrated may contain several of these above-described carbamate terminal groupings.

The reaction between the nitrating agent and organic compounds having at least one of the N-fluorocarbamate terminal groups proceeds in accordance with the following general reaction equation wherein nitric acid is shown as the nitrating agent for the purpose of illustration:

(I)

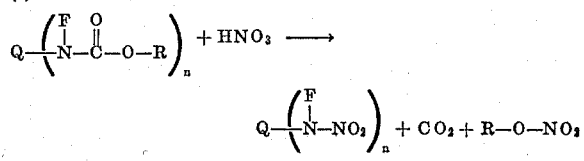

wherein Q is a monovalent or polyvalent organic radical, R is a hydrocarbyl radical, and $n$ is a small whole number of from 1 to about 5. In general, the valence of Q corresponds numerically to the value of $n$. Preferably, in the above equation, Q and R each contain from 1 to about 20 carbon atoms.

As has been indicated above, Q in the above reaction equation can be any monovalent or polyvalent organic radical.

For example, compounds of the formula:

(II)

wherein R′ is a substituted or unsubstituted hydrocarbyl or monovalent heterocyclic radical, preferably having from 1 to about 20 atoms; may be prepared from the corresponding N-fluorocarbamate in accordance with this invention.

Typical of suitable hydrocarbyl radicals are alkyl radicals, alkenyl radicals, aryl radicals, cycloalkyl radicals, alkaryl radicals and aralkyl radicals. Particularly suitable alkyl radicals are those having from 1 to about 20 carbon atoms, such as methyl, ethyl, propyl, dodecyl, eicosyl, etc. Preferred cycloalkyl radicals are cyclohexyl and cyclopentyl radicals. Aryl radicals are illustrated by phenyl, naphthyl, anthracyl, etc. Exemplary aryl radicals are those having from 1 to about 12 carbon atoms. Typical aralkyl and alkaryl radicals are benzyl and tolyl. In general, the lower hydrocarbyl radicals are preferred, i.e., those having less than 10 carbon atoms since such compounds have a higher percentage of the energetic $NO_2$ and N—F groups, thus rendering them more effective as explosives.

Suitable monovalent heterocyclic radicals are, for example, pyridyl, furyl, tetrazolyl, tetrazinyl, benzothiofuryl, thienyl, pyrryl, etc. Preferred monovalent heterocyclic radicals are those containing 5 or 6 atoms in the ring, 1 to 4 of which are nitrogen atoms with the balance of the ring being carbon atoms. It should be understood that any of the above-mentioned monovalent organic radicals may carry from 1 up to about 5 substituent groups such as nitro, hydroxy, halogen, sulpho, carboxy, etc.

These substituted hydrocarbyl radicals include nitroalkyl, nitroaryl, haloalkyl, haloaryl, hydroxy alkyl, carboxy alkyl, etc. Typical of specific substituent-carrying radicals are the nitroethyl, methyol, ethylol, pentachlorophenyl, hydroxy phenyl, trifluoropropyl, 2-sulfoethyl, nitropyridyl, ω-carboxypropyl, and 2,5-dichlorocyclohexyl groups.

As is apparent from the foregoing, by the process of this invention, the following compounds within the scope of Formula (II) may be prepared:

N-fluoro-N-nitro methylamine;
N-fluoro-N-nitro-2-sulfoethylamine;
N-fluoro-N-nitro isopropylamine;
N-fluoro-N-nitro ethanolamine;
N-fluoro-N-nitro-2,2,4,4-tetranitro pentylamine;
N-fluoro-N-nitro decylamine;
N-fluoro-N-nitro phenylamine;
N-fluoro-N-nitro pentachlorophenylamine;
N-fluoro-N-nitro glycine;
N-fluoro-N-nitro cyclohexylamine;
N-fluoro-N-nitro cyclopentylamine;
N-fluoro-N-nitro propenylamine;
N-fluoro-N-nitro dodecenylamine;
N-fluoro-N-nitro anthracylamine;
N-fluoro-N-nitro biphenylylamine;
N-fluoro-N-nitro paradichloroaniline;
N-fluoro-N-nitro tolylamine;
N-fluoro-N-nitro benzylamine;
5-(fluoronitroamino) tetrazole;
2-(fluoronitroamine) pyridine; and
N-fluoro-N-nitro chloromethylamine.

In addition to those above-mentioned, other compounds prepared according to this invention include those containing monovalent radicals which are interrupted by hetero-atoms such as sulfur, oxygen and nitrogen. The preparation of hetero-interruped compounds is illustrated by the following equation using nitric acid as the nitrating agent:

(III)

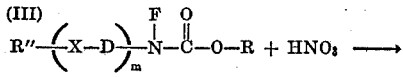

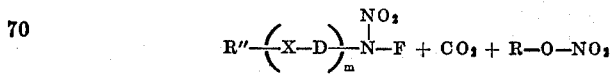

wherein R'' is hydrocarbyl such as alkyl or aryl; X is aza,

nitro substituted nitrogen (nitraza), oxygen or sulfur; D is alkylene or arylene, m is a small whole number of from 1 to about 5, and R is as defined above. Preferably, R'' and D contain from 1 to about 10 carbon atoms. The groups R'' and D may carry up to about 5 substituents such as nitro or halo, i.e., R'' and D may be nitroalkylene, haloalkylene, haloarylene, nitroarylene, etc.

The following equation illustrates the preparation of a compound containing a hetero oxygen atom from the corresponding ethyl N-fluorocarbamate:

(IV)
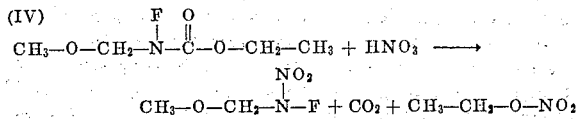

Typical of the compounds containing the hetero sulfur atom is the compound of the formula:

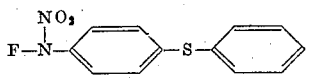

Similarly, other compounds containing the above-mentioned hetero-interrupted groups such as N-fluoro-N-nitro-2 - methoxy - ethylamine; N-fluoro-N-nitro-3-thio-pentylamine; N-fluoro-N-nitro-2-aza propylamine; N-fluoro-N-nitro - 3 - nitraza pentylamine and N-fluoro-N-nitro-3-aza hexylamine may be prepared by the nitration process of this invention.

When Q is divalent organic radical in Reaction I, the nitration may be illustrated by the following equation:

(V)
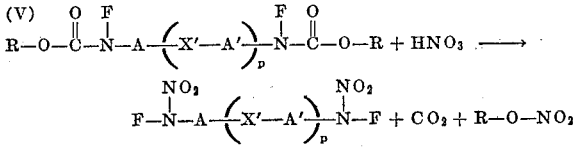

wherein A and A' may be, for example, alkylene and arylene; X' is aza, nitraza, sulfur or oxygen; and p has a value from 0 to about 5. The groups A and A' may carry substituents such as halogen, nitro, sulfo, hydroxy and carboxy groups. Preferably, the groups A and A' are lower alkylene, arylene, nitroalkylene, nitroarylene, haloalkylene and haloarylene; and contain from 1 to about 10 carbon atoms.

Illustrative of compounds produced in accordance with Reaction V wherein Q is divalent are: N,N'-difluoro-N,N-dinitro - methylenediamine; N,N' - difluoro-N,N'-dinitroethylenediamine; N,N' - difluoro-N,N'-dinitrodecamethylenediamine; N,N' - difluoro - N,N' - dinitro-paraphenylenediamine; N,N' - difluoro - N,N - dinitro-naphthylenediamine; 1,7-difluoro-1,4,7-trinitraza heptane; 1,5-difluoro-1,5 - dinitro - 3-thio-pentanediamine; and N,N'-difluoro-N, N'-dinitro-3,3-dichloro-1,5-pentane diamine.

In summary, the Q radical in the carbamate reactants and the products of the instant process are mono or polyvalent organic radicals. The most desirable monovalent organic being hydrocarbyl, monovalent heterocyclic, nitro-, hydroxy-, sulfo-, halo-, and carboxy-substituted hydrocarbyl; and hetero-interrupted radicals having the formula:

and the preferred polyvalent radicals being selected from the group consisting of:

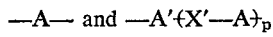

wherein R'', X, D, A, A', m and p are as previously defined.

The choice of nitrating agent in my process is not critical. While 100 percent nitric acid is preferred, other nitrating agents such as nitric acid-acetic anhydride mixtures; the alkyl nitrates such as methyl nitrate and ethyl nitrate; and the inorganic nitronium salts such as nitronium tetrafluoroborate and nitronium perchlorate may be used.

The temperature at which these nitration reactions are carried out is not critical. Normally it is desirable to keep the temperature around 0° C. when working with nitric acid, and thus the preferred reaction temperature is between about −40° C. and about +40° C. More preferably the reaction is carried out between the temperature of about −5° C. and +5° C.

The N-fluorocarbamate reactants of this invention may be obtained in accordance with the procedures described in assignee's copending United States patent application Ser. No. 404,207, filed Oct. 14, 1964, the disclosure of which is expressly incorporated herein by reference.

In the nitrations of this invention the proportions of the reactants are not critical. For best results the organic N-fluorocarbamate and nitrating agent should be used in approximately stoichiometrically equivalent amounts since the use of excessive nitrating agent may result in undesirable contamination of the desired product.

The products from the process of this invention may be isolated in conventional manner, i.e., by filtration, crystallization, extraction and/or distillation.

The nitration reactions in this invention may be carried out under any suitable pressure. Normally atmospheric pressure is used since it is most convenient. However, it may be sometimes desirable to conduct the nitration under elevated pressure or under vacuum, and both of these expedients are envisioned.

The examples which follow are presented only for purpose of illustration and should not be regarded as limitative of the scope of our invention in any way. In the examples, percentages are by weight and gas volumes are at standard temperatures and pressure unless otherwise indicated.

Example I.—Preparation of N-fluoro-N-nitro-butylamine

To 25 ml. of 100 percent nitric acid was added with stirring at −5 to 0° C., 4.0 grams of methyl N-n-butyl-N-fluoro-carbamate over a period of 30 minutes. The gaseous reaction product escaping during the course of the reaction was found to be pure carbon dioxide. The reaction mixture was poured on 100 grams of crushed ice and the aqueous mixture extracted with three 20-ml. portions of methylene chloride. The combined extracts were dried and the filtered solution was concentrated to remove the solvent. The residual liquid was distilled to give 3.0 grams of N-fluoro-N-nitro-n-butylamine, B.P. 40 to 41° C./25 mm., $n_D^{25} 1.4040$. The identity of the product was established by elemental analysis and $F^{19}$ and proton NMR spectra. The product was identical with that obtained on direct fluorination of n-butylnitramine, $n\text{-}C_4H_9NHNO_2$.

Example II.—Preparation of N,N'-difluoro-N,N'-dinitroethylenediamine

To 25 ml. of 100 percent nitric acid is added with stirring at −5 to 0° C., 4.0 grams of N,N'-difluoro-ethylenediamine-bis-ethyl carbamate over a period of 30 minutes. The gaseous reaction product escaping during the course of the reaction is found to be pure carbon dioxide. The reaction mixture is poured on 100 grams of crushed ice and the aqueous mixture extracted with three 20-ml. portions of methylene chloride. The combined extracts are dried and the filtered solution is concentrated to remove the solvent. The residual liquid is distilled to give about 3.0 grams of N,N'-difluoro-N,N'-dinitroethylenediamine. The identity of the product was established by elemental analysis.

Example III.—Preparation of N-fluoro-N-nitro cyclohexylamine

To 25 ml. of ethyl nitrate is added with stirring at −5 to 0° C., 4.0 grams of propyl N-cyclohexyl-N-fluorocarbamate over a period of 30 minutes. The reaction mixture is poured on 100 grams of crushed ice and the aqueous mixture extracted with methylene chloride. The combined extracts are dried and the filtered solution is concentrated to remove the solvent. The residual liquid is distilled to give a good yield of N-fluoro-N-nitro-cyclohexylamine. The identity of the product was established by elemental analysis.

Example IV.—Preparation of N-fluoro-N-nitro cyclopentylamine

To 25 ml. of nitronium tetrafluoroborate is added with stirring at −5° C., 4.0 grams of phenyl N-cyclopentyl-N-fluorocarbamate over a period of 30 minutes. The gaseous reaction product escaping during the course of the reaction is found to be pure carbon dioxide. The reaction mixture is poured on 100 grams of crushed ice and the aqueous mixture extracted with three 20-ml. portions of methylene chloride. The combined extracts were dried and the filtered solution is concentrated to remove the solvent. The residual liquid is distilled to give 3.0 grams of N-fluoro-N-nitro cyclopentylamine. The identity of the product was established by elemental analysis.

Example V.—Preparation of N-fluoro-N-nitro 2,2,4,4-tetranitro-pentylamine

To 35 ml. of 100 percent nitric acid is added with stirring at about +5° C., about 6.0 grams of ethyl N-2,2,4,4-tetranitropentyl-N-fluorocarbamate over a period of about one hour. The reaction mixture is poured on crushed ice and the aqueous mixture is extracted with methylene chloride. The combined extracts are dried and the filtered solution is concentrated. The residual liquid is distilled to give a good yield of N-fluoro-N-nitro 2,2,4,4-tetranitropentylamine, identified by gas chromatography.

Example VI.—Preparation of 1,7-difluoro-4-chloro-1,7-dinitraza heptane

To 25 ml. of 100 percent nitric acid is added with stirring at −5 to 0° C., 4.0 grams of 1,7-difluoro-4-chloro-1,7-diamino heptane-bis-butylcarbamate over a period of 30 minutes. The gaseous reaction product escaping during the course of the reaction is found to be pure carbon dioxide. The reaction mixture is poured on 100 grams of crushed ice and the aqueous mixture extracted with three 20-ml. portions of methylene chloride. The combined extracts are dried and the filtered solution is concentrated to remove the solvent. The residual liquid is distilled to give 3.0 grams of 1,7-difluoro-4-chloro-1,7-dinitraza heptane. The identity of the product was established by elemental analysis and F$^{19}$ and proton NMR spectra.

The N-fluoro-N-nitroamines obtainable by the process of this invention contain a plurality of energetic N—F bonds and are thus inherently useful as explosives. In additon these compounds find application as high energy components in rocket fuel formulations. Thus, the lower molecular weight compounds prepared in accordance with this invention are useful as oxidizers in liquid fuel rocket engine. For instance, such compounds can be used in lieu of nitric acid or nitrogen tetroxide to oxidize hydrazine or unsymmetrical dimethyl hydrazine fuels. Likewise, these compounds can be useful in place of liquid oxygen to oxidize the kerosene fuels commonly used in rocket engines.

The higher molecular weight compounds N-fluoro-N-nitroamines are also suitable as plasticizers for nitrocellulose and nitropolymers such as the nitro-substituted polyurethanes disclosed in assignee's copending United States patent application Ser. No. 728,491, filed Apr. 14, 1958. The compounds of this invention are also useful intermediates in the preparation of many other organic compounds.

It will be understood that various modifications may be made in this invention without departing from the spirit thereof or the scope of the appended claims.

I claim:
1. The method of preparing organic compounds of the formula:

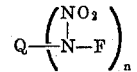

which comprises reacting a nitrating agent selected from the group consisting of 100% nitric acid, nitric acid-acetic anhydride mixtures, lower alkyl nitrates, and inorganic nitronium salts; with a compound of the formula:

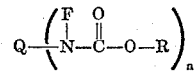

wherein in the above formulae, Q is selected from the group consisting of hydrocarbyl, nitro-substituted hydrocarbyl, halo-substituted hydrocarbyl, hydroxy-substituted hydrocarbyl, sulfo-substituted hydrocarbyl, and carboxy-substituted hydrocarbyl, R is a hydrocarbyl radical, and $n$ is a small whole number of from 1 to about 5.

2. The method of preparing organic compounds of the formula:

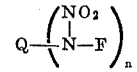

which comprises reacting 100 percent nitric acid with a compound of the formula:

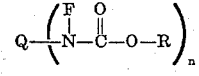

wherein in the above formulae, Q is selected from the group consisting of hydrocarbyl, nitro-substituted hydrocarbyl, halo-substituted hydrocarbyl, hydroxy-substituted hydrocarbyl, sulfo-substituted hydrocarbyl, and carboxy-substituted hydrocarbyl, R is a hydrocarbyl radical, and $n$ is a small whole number of from 1 to about 5.

3. The method of preparing organic compounds of the formula:

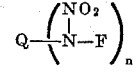

which comprises reacting nitronium tetrafluoroborate with a compound of the formula:

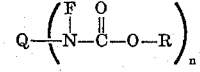

wherein in the above formulae, Q is selected from the group consisting of hydrocarbyl, nitro-substituted hydrocarbyl, halo-substituted hydrocarbyl, hydroxy-substituted hydrocarbyl, sulfo-substituted hydrocarbyl, and carboxy-substituted hydrocarbyl, R is a hydrocarbyl radical, and $n$ is a small whole number of from 1 to about 5.

4. The method of preparing organic compounds of the formula:

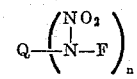

which comprises reacting methyl nitrate with a compound of the formula:

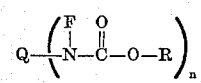

wherein in the above formulae, Q is selected from the group consisting of hydrocarbyl, nitro-substituted hydrocarbyl, halo-substituted hydrocarbyl, hydroxy-substituted hydrocarbyl, sulfo-substituted hydrocarbyl, and carboxy-substituted hydrocarbyl, R is a hydrocarbyl radical, and $n$ is a small whole number of from 1 to about 5.

5. The method of preparing organic compounds of the formula:

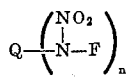

which comprises reacting ethyl nitrate with a compound of the formula:

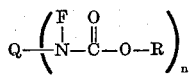

wherein in the above formulae, Q is selected from the group consisting of hydrocarbyl, nitro-substituted hydrocarbyl, halo-substituted hydrocarbyl, hydroxy-substituted hydrocarbyl, sulfo-substituted hydrocarbyl, and carboxy-substituted hydrocarbyl, R is a hydrocarbyl radical, and $n$ is a small whole number of from 1 to about 5.

6. The method of preparing organic compounds of the formula:

which comprises reacting a nitrating agent selected from the group consisting of 100% nitric acid, nitric acid-acetic anhydride mixtures, lower alkyl nitrates, and inorganic nitronium salts with a compound of the formula:

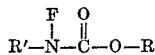

wherein the above formulae, R is a hydrocarbyl radical and R′ is selected from the group consisting of hydrocarbyl, nitro-substituted hydrocarbyl, halo-substituted hydrocarbyl, hydroxy-substituted hydrocarbyl, sulfo-substituted hydrocarbyl, and carboxy-substituted hydrocarbyl.

7. The method of preparing organic compounds of the formula:

which comprises reacting 100 percent nitric acid with a compound of the formula:

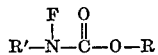

wherein in the above formulae, R is a hydrocarbyl radical and R′ is selected from the group consisting of hydrocarbyl, nitro-substituted hydrocarbyl, halo-substituted hydrocarbyl, hydroxy-substituted hydrocarbyl, sulfo-substituted hydrocarbyl, and carboxy-substituted hydrocarbyl.

8. The method of preparing organic compounds of the formula:

which comprises reacting nitronium tetrafluoroborate with a compound of the formula:

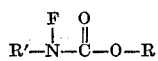

wherein in the above formulae, R is a hydrocarbyl radical and R′ is selected from the group consisting of hydrocarbyl, nitro-substituted hydrocarbyl, halo-substituted hydrocarbyl, hydroxy-substituted hydrocarbyl, sulfo-substituted hydrocarbyl, and carboxy-substituted hydrocarbyl.

9. The method of preparing compounds of the formula:

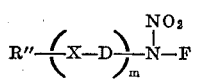

which comprises reacting a nitrating agent selected from the group consisting of 100% nitric acid, nitric acid-acetic anhydride mixtures, lower alkyl nitrates, and inorganic nitronium salts; with a compound of the formula:

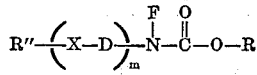

wherein the above formulae, R and R″ are hydrocarbyl, D is selected from the group consisting of arylene and alkylene, X is selected from the group consisting of oxygen, sulfur, aza and nitraza, and $m$ is an integer of from 1 to 5.

10. The method of preparing compounds of the formula:

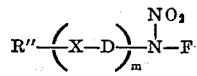

which comprises reacting 100 percent nitric acid with a compound of the formula:

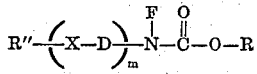

wherein in the above formulae, R and R″ are hydrocarbyl, D is selected from the group consisting of arylene and alkylene, X is selected from the group consisting of oxygen, sulfur, aza and nitraza, and $m$ is an integer of from 1 to 5.

11. The method of preparing compounds of the formula:

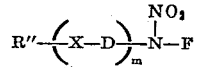

which comprises reacting nitronium tetrafluoroborate with a compound of the formula:

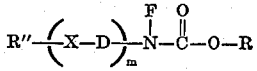

wherein in the above formulae, R and R″ are hydrocarbyl, D is selected from the group consisting of arylene and alkylene, X is selected from the group consisting of oxygen, sulfur, aza and nitraza, and $m$ is an integer of from 1 to 5.

12. The method of preparing compounds of the formula

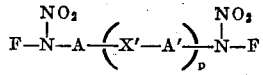

which comprises reacting a nitrating agent selected from the group consisting of 100% nitric acid, nitric acid-acetic anhydride mixtures, lower alkyl nitrates, and inorganic nitronium salts; with a compound of the formula:

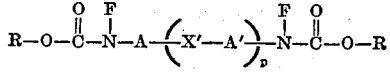

wherein in the above formulae, R is hydrocarbyl, A and A′ are selected from the group consisting of alkylene and arylene, X′ is selected from the group consisting of oxygen, nitrogen, aza and nitraza, and $p$ has a value of from 0 to about 5.

13. The method of preparing compounds of the formula:

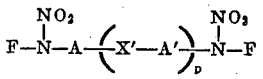

which comprises reacting 100 percent nitric acid with a compound of the formula:

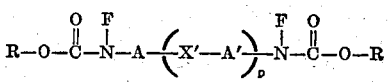

wherein in the above formulae, R is hydrocarbyl, A and A′ are selected from the group consisting of alkylene and arylene, X′ is selected from the group consisting of oxygen, nitrogen, aza and nitraza, and $p$ has a value of from 0 to about 5.

14. The method of preparing compounds of the formula:

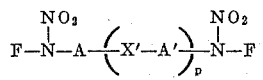

which comprises reacting nitronium tetrafluoroborate with a compound of the formula:

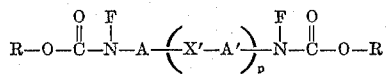

wherein in the above formulae, R is hydrocarbyl, A and A' are selected from the group consisting of alkylene and arylene, X' is selected from the group consisting of oxygen, nitrogen, aza and nitraza, and $p$ has a value of from 0 to about 5.

15. The method of preparing N-fluoro-N-nitro butylamine which comprises reacting nitric acid with methyl N-n-butyl-N-fluorocarbamate.

No references cited.

CHARLES B. PARKER, *Primary Examiner.*

REUBEN EPSTEIN, LEON D. ROSDOL, *Examiners.*

L. A. SEBASTIAN, R. RAYMOND, *Assistant Examiners.*